(12) United States Patent
Zackl (10) Patent No.: US 10,788,339 B2
(45) Date of Patent: Sep. 29, 2020

(54) OPTICAL CURVATURE SENSOR

(71) Applicant: Wilhelm Zackl, Neulengbach (AT)

(72) Inventor: Wilhelm Zackl, Neulengbach (AT)

(*) Notice: Subject to any disclaimer, the term of this patent is extended or adjusted under 35 U.S.C. 154(b) by 79 days.

(21) Appl. No.: 15/753,207

(22) PCT Filed: Aug. 17, 2016

(86) PCT No.: PCT/EP2016/069542
§ 371 (c)(1),
(2) Date: Feb. 16, 2018

(87) PCT Pub. No.: WO2017/029340
PCT Pub. Date: Feb. 23, 2017

(65) Prior Publication Data
US 2018/0238719 A1    Aug. 23, 2018

(30) Foreign Application Priority Data
Aug. 17, 2015   (AT) .................................. A 539/2015

(51) Int. Cl.
| G01D 5/34 | (2006.01) |
| G01D 5/353 | (2006.01) |
| G01B 11/16 | (2006.01) |
| F21V 8/00 | (2006.01) |

(52) U.S. Cl.
CPC ......... *G01D 5/35345* (2013.01); *G01B 11/18* (2013.01); *G02B 6/001* (2013.01); *G02B 6/0016* (2013.01); *G02B 6/0038* (2013.01)

(58) Field of Classification Search
CPC .............................. G02B 6/0016; G02B 11/18
See application file for complete search history.

(56) References Cited

U.S. PATENT DOCUMENTS

| 2011/0134623 A1* | 6/2011 | Sherman | ............... G02B 6/005 |
| | | | 362/19 |
| 2016/0054601 A1* | 2/2016 | Kitamura | ............. G02B 6/0036 |
| | | | 349/33 |

FOREIGN PATENT DOCUMENTS

EP     0 939 064 A2     9/1999

OTHER PUBLICATIONS

International Search Report, dated Nov. 29, 2016 (3 pages).
International Preliminary Report on Patentability, dated Feb. 20, 2018 (11 pages).
Stupar et al., "The possibility of using a plastic optical fibre as a sensing element in civil structural health monitoring", Physica Scripta, Institute of Physics Publishing, vol. 2013, No. T157, Nov. 15, 2013, p. 14031 cited in the ISR (4 pages).
Rahnavardy et al., "Investigation and application of the frustrated-total-internal-reflection phenomenon in optical fibers", Applied Optics, vol. 36, No. 10, Apr. 1, 1997, pp. 2183-2187, cited in the ISR (5 pages).

* cited by examiner

*Primary Examiner* — Tony Ko
(74) *Attorney, Agent, or Firm* — Jacobson Holman, PLLC (57) ABSTRACT

The invention relates to a light conductor for sensory purposes, comprising at least one crack, wherein a longitudinal direction of the crack relative to a direction of propagation of the light conductor includes an angle of incidence ($\theta$), and wherein the crack is delimited by two boundary surfaces, each of which is substantially parallel to the longitudinal direction of the crack, the two boundary surfaces including an opening angle ($\alpha$), said opening angle ($\alpha$) being greater than 0°.

9 Claims, 5 Drawing Sheets

OPTICAL CURVATURE SENSOR

BACKGROUND OF THE INVENTION

The invention relates to a light conductor, an optical sensor having a light conductor and a method for producing a light conductor.

From the prior art, optically operating strain sensors are known which can detect an expansion of light conductors used in the sensors. In this case, specific regions of the light spectrum are usually cancelled on account of interference on gaps regularly arranged in the light conductor. For this purpose, light having a specific spectrum is required for feeding into the light conductor, and, on the other hand, a means for spectral analysis of the light emerging from the light conductor. The advantage of such sensors is that they can detect changes in length in the nanometer range with high accuracy. However, it is disadvantageous that the required special components making such a sensor difficult to miniaturize and very expensive to produce. Furthermore, a precise arrangement of columns in the light conductor required for this type of sensors is difficult to produce, which increases both the costs and the susceptibility to errors and/or failures of the sensor.

BRIEF SUMMARY OF THE INVENTION

The aim of the invention is therefore to overcome the disadvantages described above and to provide a possibility for a highly sensitive, optical sensor which can be easily miniaturized and produced at the same time.

This object is achieved according to the invention by a light conductor having at least one crack, wherein a longitudinal direction of the crack to a propagation direction of the light conductor spans an angle of incidence (6) and wherein the crack is limited by two boundary surfaces, which are each substantially parallel to the longitudinal direction of the crack, wherein the two boundary surfaces span an opening angle ($\alpha$), wherein the opening angle ($\alpha$) is greater than 0°, wherein a first boundary surface is located in the direction of propagation of the light conductor at the transition from the light conductor to the medium, wherein a second boundary surface is located in the direction of propagation of the light conductor at the transition from the medium to the light conductor, wherein on the first boundary surface an evanescent wave is produced, wherein the second boundary surface is arranged within the evanescent wave and wherein the crack has a lower height than a height of the light conductor.

This object is further achieved by an optical sensor.

BRIEF DESCRIPTION OF THE DRAWINGS

Preferred and advantageous exemplary embodiments of the invention are described in more detail below with reference to the drawings, in which for the sake of clarity, identical components are identified by the same reference symbols in different embodiments. The invention is shown in part in a highly schematic manner:

FIG. 8 shows a first embodiment of a sensor having two light guides according to the invention, FIG. 9 shows a first variant of a light conductor according to the invention together with a diagram of the refractive index of the light conductor, FIG. 11 shows a third variant of a light conductor according to the invention, FIG. 11A shows a section through the latter and the associated diagram of the refractive index, FIG. 12 a fourth variant of a light conductor according to the invention together with a diagram of the refractive index of the light conductor, FIG. 13 a fifth variant of a light conductor according to the invention, and a section through said light conductor, FIG. 14 a second embodiment of a sensor, FIG. 15 the embodiment of FIG. 8 in the representation of FIG. 14, FIG. 16 a third embodiment of a sensor, FIG. 17 a fourth embodiment of a sensor, FIG. 17 a cross section through the light conductor of FIG. 17, FIG. 18 a first embodiment for one end of the light conductor according to the invention.

DETAILED DESCRIPTION OF THE INVENTION

Figure 1:
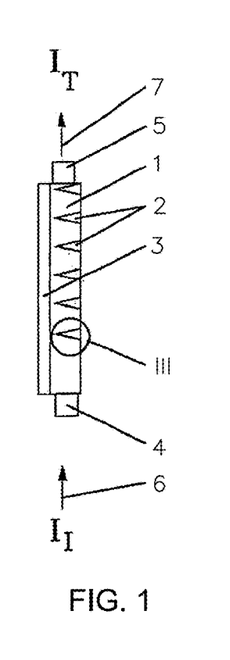
FIG. 1 shows a longitudinal section by means of a first embodiment of a light conductor according to the invention.

FIG. 1 shows, in a highly schematic manner, a light conductor 1 having six symbolic cracks 2, which is arranged on a carrier 3, and a means for coupling in light 4 and a means for coupling out light 5. An arrow 6 symbolically represents light which is guided into the light conductor with an input intensity $I_I$. An arrow 7 symbolically represents light which exits from the light conductor with an output intensity $I_T$.

Figure 2:
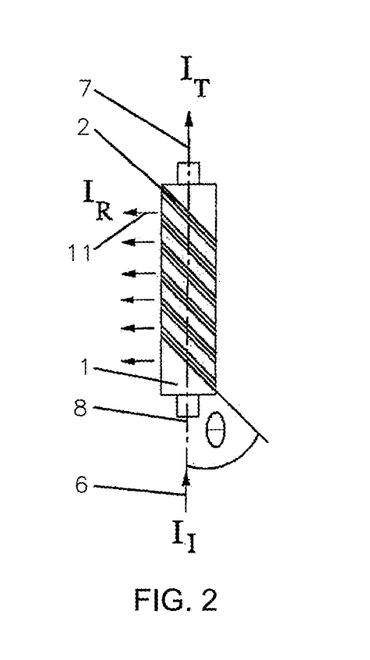
FIG. 2 shows the light conductor of FIG. 1 in a top view.

In the plan view of FIG. 2, it can be seen that the cracks 2 of the light conductor 1 have a longitudinal direction, which, with a direction of propagation of the light conductor (symbolically represented by the axis 8), forms an angle of incidence θ.

The angle of incidence θ is determined in such a way that at least part of the light at the transition from the light conductor 1 to the crack 2 can be reflected or totally reflected.

Depending on the material which fills the crack (air in the example shown), the material of the light conductor, the wavelength of the light conducted into the light conductor and further factors such as, for example, the operating temperature, in which the light conductor is to be used, the angle of incidence θ can be appropriately selected by the person skilled in the art.

In the materials and wavelengths customary in the prior art, it is generally to be expected that good measurable results are achieved, if the angle of incidence θ lies between 20° and 80°.

In the preferred embodiment shown, θ=45° is selected, since this angle has proven successful for total reflection in most cases.

Figure 3:
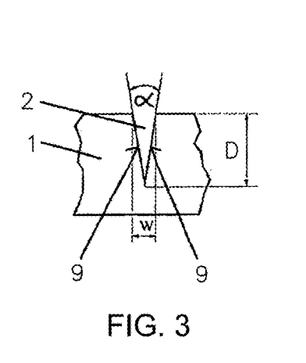
FIG. 3 shows a detail from FIG. 1.

The geometry of the cracks itself is shown on the basis of FIG. 3.

Each crack in this case has an opening angle α enclosed by two boundary surfaces 9, a height D and an opening width W.

In this case, the representation is highly schematically illustrated for the sake of better clarity. The opening width W of the cracks is usually in the nanometer range. However, in the case of light conductors having a large height D, it can also happen that the opening width becomes much larger. However, only the region of the crack near the apex of the opening angle is used by sensors, since the effects described below, which are used in the invention, do not occur at excessively large distances.

According to the invention, therefore, the following applies to the angle α in a neutral state of the light conductor 1:

$$0 < \alpha < \frac{k}{d} < 90°,$$

wherein d is the height of the light conductor, and k is a factor which is of a wavelength λ with which the light conductor 1 is operated, is dependent on, wherein the factor k at a wavelength λ of 0.0002 mm to 0.001 mm equal to 0.57, wherein the factor k at a wavelength λ of from 0.001 mm to 0.003 mm equal to 1.7, wherein the factor k at a wavelength λ of 0.003 mm to 0.05 mm equal to 28, and wherein the factor k at a wavelength λ of from 0.05 mm to 1 mm equal to 157, as well as shown in the following table:

| | λ [mm] | k [mm] |
|---|---|---|
| UV ultraviolet light and VIS visible light | 0.0002-0.001 | 0.57 |
| NIR near infrared | 0.001-0.003 | 1.7 |
| MIR average infrared | 0.003-0.05 | 28 |
| IR far infrared | 0.05-1 | 157 |

In this way, in contrast to Bragg-sensors, which work with interference, the Goos-Hähnchen-effect is used. This effect basically happens at each total reflection. In this case, the light penetrates approximately to a depth of its half the wave length from the optically denser in the optically thinner medium and is reflected with a spatial displacement. This part of the light, which penetrates in the optically thinner medium is also called evanescent wave. If a further optical medium having a higher optical density is arranged in the region of the evanescent wave, a part of the light can seep into the optically denser medium despite total reflection. The latter is also called "leaking".

If this occurs, one is speaking of frustrated total internal reflection. The effect of the frustrated total internal reflection the stronger, the closer the optically denser medium in the region of the evanescent wave is arranged.

For the inventive light conductor it means, that in the case of a smaller opening angle α and at a lower opening width W more light leaks in the direction of the propagation direction 8 back into the light conductor 1.

If the incident angle θ only slightly differs, for example by a few degrees from the critical angle of total reflection $$\left(90 - \arcsin\left(\frac{n_m}{n}\right)\right),$$

even so a partial reflection or total reflection of the light can be achieved.

The portion of the reflected or totally reflected light is represented in FIG. 2 by arrows 11, which symbolize the emerging or reflected reflexion intensity $I_R$. In this case, a measurement of a change in the crack can theoretically be carried out both by detecting the output intensity $I_T$ and by detecting the reflection intensity $I_R$. In certain cases in which, for example, scatter losses are also to be detected, for example, in order to monitor the state of the sensor itself, both intensities $I_R$ and $I_T$ can be detected and compared with the input intensity $I_I$.

Figure 4:
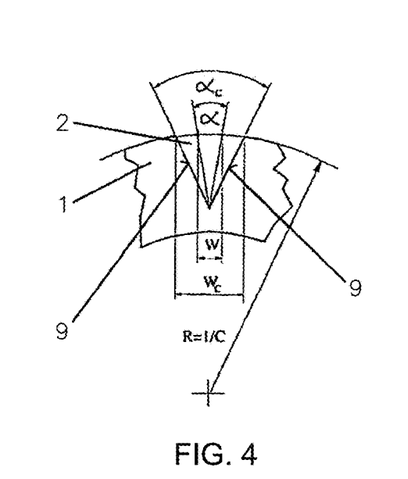
FIG. 4 shows the section of FIG. 3 in a bent state.
Figure 5:
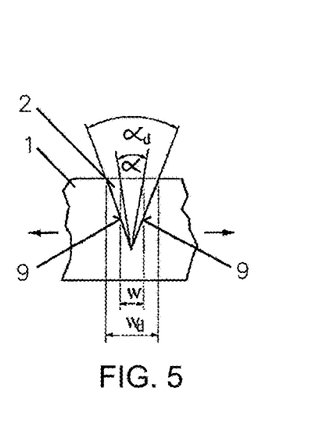
FIG. 5 shows the section from FIG. 3 in the stretched state.

FIG. 4 illustrates how a deformation of the light conductor has an effect on the opening width W and the opening angle α by bending. FIG. 5 analogously illustrates a deformation by stretching the light conductor. The not deformed guide of FIG. 3 can be regarded as being in a neutral state compared to FIG. 4 and FIG. 5.

It can be seen that a single light conductor can be used both in an elongation sensor and in a bending sensor, but that it is not possible to distinguish between the two deformations, if a change in the opening width W is detected via a change in the light intensities. If, however, all the cracks of a light conductor are identically aligned with respect to the orientation from the apex to the opening, two light conductors with oppositely oriented cracks can be arranged in a sensor.

In principle, in particular in the case of light conductors according to the invention having a flat cross section, the sensory sensitivity in the case of deformations orthogonal to the cracks is maximal and is minimal along the cracks, that is to say overall vectorially. By combining two or more light conductors according to the invention with different angles θ of the cracks, which are preferably arranged such that the longitudinal directions of the cracks are orthogonal to one another, strains and bends can be measured at once in different directions.

Figure 6:
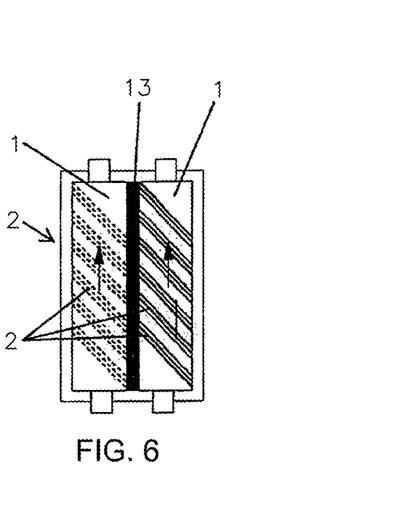
FIG. 6 shows a schematically illustrated sensor element having two light conductors according to the invention.

A sensor element 12 having two light conductors 1 arranged in this manner is shown in FIG. 6. Furthermore, FIG. 6 shows an optical separation element 13, by means of which it is prevented that light emerging from one conductor enters the respective other one and thus impairs the measurements.

Figure 7:
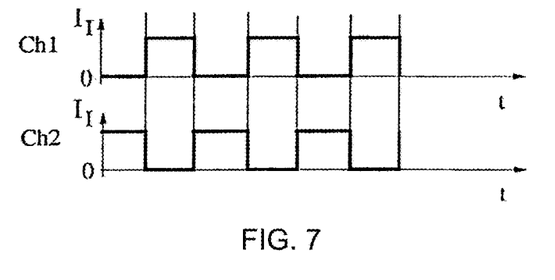
FIG. 7 shows an exemplary graph for feeding light into a sensor element of FIG. 6.

In an alternative or additionally preferred application form of such a sensor element, light can also be alternately coupled into both light conductors, as illustrated in FIG. 7. In this case, the upper graph shows the input intensity $I_I$ of the light coupled into the first light conductor 1*a*, and the second graph shows the input intensity $I_I$ of the light coupled into the second light conductor 1*b* at the same time. If the modulation frequency selected by the person skilled in the art, the additional advantage can be achieved that light from external light sources in the region of a sensor, which is equipped with light conductors according to the invention, can be mathematically removed from the measurements. For this purpose, it is only necessary to know the frequency with which possible light sources emit light in the surroundings of the sensor. It is particularly favorable if the largest possible difference is selected between the frequency of the coupled-in light and the ambient light.

Of course, further measures are also conceivable and advantageous in order to prevent, in such a way that the light exiting from a light conductor impairs the measurement on an adjacent light conductor. For example, the light introduced into adjacent optical waveguides can have different wavelengths and/or different polarization.

Different polarization directions and wavelengths can also be used, in order to reduce the number of (optical) leads to a sensor element, in that the light signals, which can be distinguished by wavelength or polarization direction, for the individual light conductors are combined in a normal light conductor and can be separated again after the forwarding.

Figures 8, 9, 11, 12:
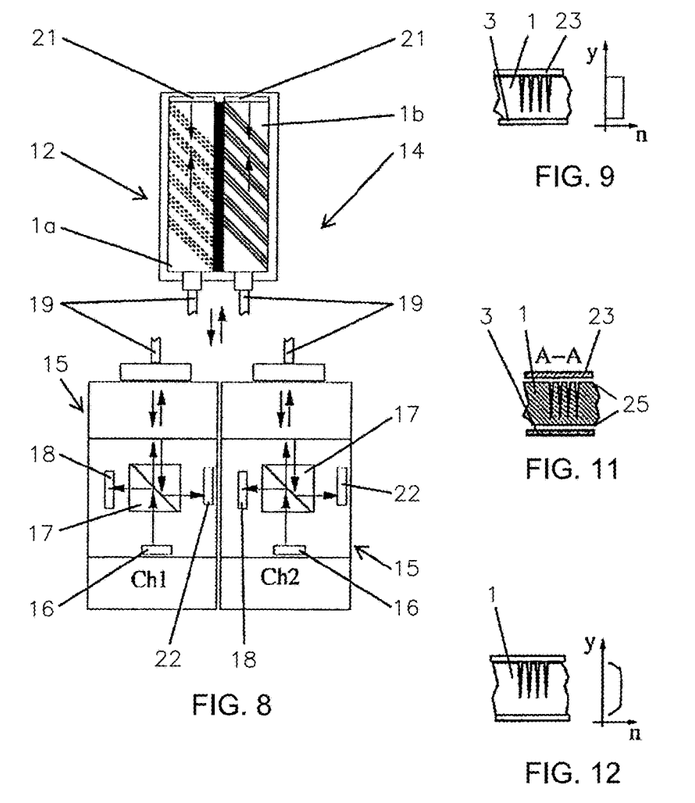

FIG. 8 shows a sensor 14 with two light conductors 1 according to the invention, which are arranged in a sensor element 12 in this case, control units 15 take over the coupling-in, coupling-out and evaluation of the light.

Each control unit 15 has a means for generating light 16. The means for generating light can be freely selected by the person skilled in the art from the prior art, for example light-emitting diodes, lasers, incandescent lamps and the like. Furthermore, the control units can, depending on the selected means for generating light, be optical elements (not shown), such as, for example, lenses, diaphragms and the like. These can in principle be arranged at a suitable point in the control elements 15. However, it is considered advantageous to arrange the optical elements in the beam path of the light immediately after the means for generating light 16. The beam path or propagation direction of the light is symbolically represented by arrows in FIG. 8.

Since both control units are constructed identically and the path, which receives the light through the control units 16 and the sensor element 12, except for the orientation of the light conductors 1 according to the invention does not differ from each control unit, the path of the light is simultaneously described by the arrangement for both sides of the sensor.

From the means for generating the light 16 starting, in the control unit 16 the light impinges first of all on a beam divider 17. A part of the light is directed from the beam divider 17 into a input detector 18. This can be used, for example, to detect at which input intensity $I_I$ the light leaves the control unit 15 or, for example, also at which frequency, when the latter is modulated as shown in FIG. 7.

After the beam splitter 17, the light which is not branched off to the input detector 18 reaches a conventional light conductor 19, which directs the light to the sensor element 12. In the sensor element 12, the light passes through the light conductor 1 according to the invention and then impinges on a mirror element 21, from where it passes through the light conductor 1*a* further time according to the invention. Of course, instead of the mirror element, it could also be connected directly, optionally via a light conductor or the like, a detector can be arranged in order to detect the light after one time passing through the light conductors 1 according to the invention. However, in the depicted embodiment in FIG. 8 form the inventive light conductor 1*a*, 1*b* light passes through twice, which increases the sensitivity of the sensor.

After the light guide 1 according to the invention has been passed through the second time, the light reaches the control unit 15 via the conventional light guide 19 and strikes the beam splitter 17 again in said control unit. The latter deflects a part of the light into an output detector 22. The intensity values $I_T$, which are detected by the output detectors 22, provide information about the strength of the deformation of the light conductors according to the invention. A comparison of the output intensities $I_T$ detected by the output detectors gives information about the type of deformation (bending/expansion).

The in FIG. 9 shown inventive light conductor 1 is arranged on a carrier 3 and has a cover layer 23. The cover layer 23 can fulfil various functions. On the one hand, it is possible to prevent dirt particles from entering the cracks from the surroundings. The graph shows that the refractive index of the light conductor is constant over its height.

If a cover layer is omitted so that the cracks 2 of the light conductor 1 according to the invention are subjected to a possible contamination, this can accordingly to a preferred but independently usable further embodiment of the invention be used for analytics. More details can be taken from the explanations relating to FIGS. 33 to 36 further below.

Figure 10:
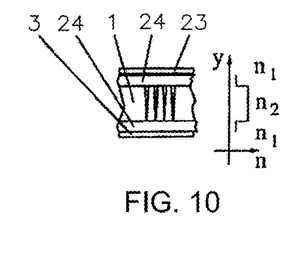
FIG. 10 shows a second variant of a light conductor according to the invention together with a diagram of the refractive index of the light conductor.

FIG. 10 shows an embodiment of the light conductor 1 according to the invention, in which in each case an intermediate layer 24 is introduced between the light conductor 1 and the cover layer 23 and between the light conductor 1 and the carrier 3. As the graph shows, the latter has a lower refractive index than the light conductor 1. Because of the lower refractive index in the intermediate layer (s) 24 there is total reflection in the interior of the light conductor 1, as a result the light does not penetrate to the cover layer 23. This prevents the cover layer, which can also serve, for example, for shading, from being able to absorb light, as a result of which the light intensity cannot decrease through the cover layer 23, in particular since such a cover layer is often black.

Furthermore, light is prevented from being guided past the cracks at the top or bottom, which is particularly advantageous in particular in the case of very highly miniaturized sensors with correspondingly small-dimensioned light conductors according to the invention.

Of course, it is also possible to configure the cover layer 23 to be specularly reflecting, however, it is technically very much more complex to produce such a reflective cover layer.

Furthermore, total reflection can be effected without loss, which can hardly be achieved in the case of a reflective covering layer purely from the mathematical viewpoint.

In addition, the production of optical waveguides according to the invention with a reflective cover layer 23 entails its own problems, since stresses can arise in this case, the influence on the formation of cracks or the entire structural integrity of the light conductor must be taken and taken into account accordingly.

Figure 11A:
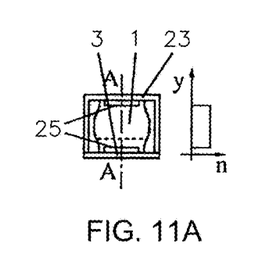

While the light conductors I of FIGS. 9 and 10 have a rectangular cross section, FIGS. 11 and 11A show an embodiment with an alternative cross-sectional geometry of this light conductor 1 according to the invention. In this embodiment, the cover layer 23 and the carrier 3 are spaced apart from the light conductor 1 at most points. Unintentional losses in the light intensity I can thereby be avoided, since the internal total reflection within the light conductor (away from the cracks) is thereby promoted. The spacing takes place, as can be seen in FIG. 11, via a recess 25 on the upper and lower sides of the light conductor 1. The graph shows that the refractive index of the light conductor in the area between the recesses is constant.

FIG. 12 shows a light conductor 1, which has a non-constant refractive index. Also in this embodiment of a light conductor 1 according to the invention, the advantages of internal total reflection between the inner and outer regions of the light conductor 1 are utilized, as already explained with reference to FIG. 10.

Figure 13:
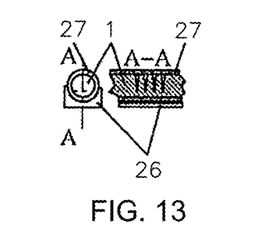

FIG. 13 shows a light conductor 1 according to the invention having a round cross section, which is arranged on a mounting layer 26 and is delimited by an envelope layer 27. In principle, a plurality of layers, which generally also have different mechanical properties, are used, so these layers can be utilized to influence the (further) crack growth. Due to the mechanical loading of the light conductor during the use of the light conductor, crack growth must be expected for sensory purposes.

The person skilled in the art will therefore preferably tune the cracks and layers in such a way that the long-term stability of the sensor is as high as possible. In a simple example of use, for example, the crack growth in a light conductor 1 according to the invention made of glass is completely stopped by an envelope layer 27 made of an elastic polymer or silicate.

As already explained above, an opposite arrangement of at least two light conductors according to the invention is required for simultaneous strain and curvature measurement. The sensor arrangements schematically shown in FIGS. 14 to 17 are to be correspondingly doubled for this application. For the sake of clarity, only one light conductor according to the invention with corresponding periphery is shown in each case.

Figure 14:
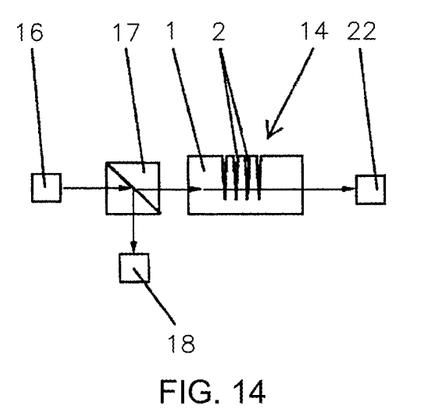

FIG. 14 shows the basic structure of a sensor 14 with optical waveguides 1 according to the invention. The light also here firstly leaves the light source 16 and then passes into the beam splitter 17, from where a part of the light in an input sensor 18 is detected. The remaining beam then passes through the light conductor according to the invention 1. The light emerging from the light conductor 1 is then detected (without reflection) by the output sensor 22.

Figure 15:
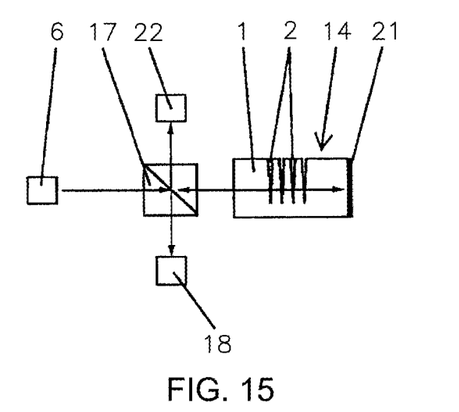
Figure 16:
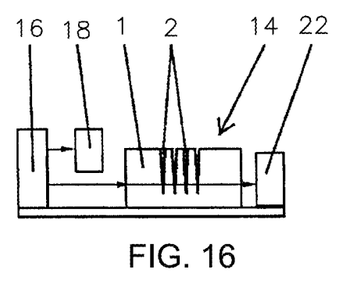

FIG. 15 shows the structure of the sensor of FIG. 8 in the representation of FIG. 14. FIG. 16 shows a sensor 14, in which part of the light generated by the light source 16 passes directly into the input sensor 18. The remaining light passes through the light conductor 1 according to the invention and then passes into the output sensor 22.

Figure 17:
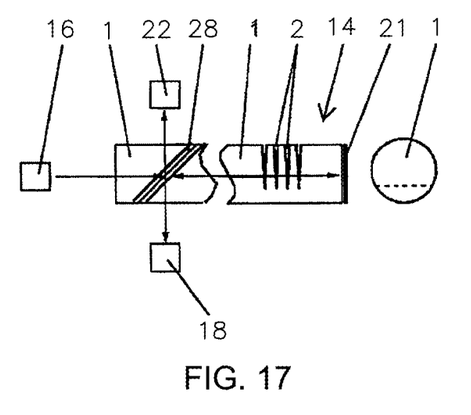

In the embodiment shown in FIG. 17, a beam splitter is dispensed with as an independent component. Instead, the latter is integrated in the form of an additional crack 28 in the light conductor according to the invention. In order to obtain the conditions of frustrated total reflection required for the function as beam splitters, the crack should be protected from expanding together with the cracks intended for sensory purposes.

For this purpose, a deformation-resistant covering can be provided at least partially around the light conductor in the region of the additional crack 28. A further measure, in order to avoid the widening of the additional crack 28, is to orient the latter spatially differently than the usual cracks. A possible embodiment for this is shown in FIG. 17, in which the additional crack 28 is arranged in the light conductor 1 rotated by 90° with respect to the cracks according to the invention. In order to configure such an arrangement in a particularly simple manner, the light conductor has a round cross section in the illustrated embodiment, as is shown in FIG. 17a. Other, for example square, cross-sectional shapes are of course also conceivable.

As already explained with reference to FIG. 8, it can be advantageous, when the light guided into the light guide according to the invention is reflected at its end 29. This can be achieved in different ways, as is shown by way of example in FIGS. 18 to 21.

Figure 18:
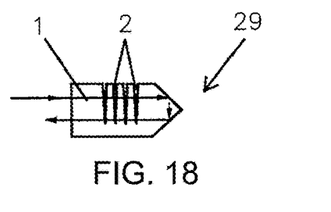

FIG. 18 shows the end 29 of the light conductor 1 according to the invention, which is shaped in such a way that a double internal total reflection can occur. The shape can be created, for example, by cutting or grinding. The advantage of this embodiment is that no reflecting element at the end 29 of the light conductor 1 is required.

Figure 19:
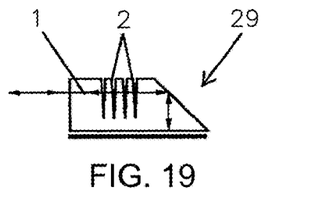
FIG. 19 shows a second embodiment for one end of the light conductor according to the invention, FIG. 20 a third embodiment for one end of the light conductor according to the invention, FIG. 21 a fourth embodiment for one end of the light conductor according to the invention.

FIG. 19 shows the end 29 of the light conductor 1, which in this embodiment is shaped in such a way, that a simple internal total reflection occurs. As a result, the mirror element can be arranged below the light conductor, which can be advantageous in the design of a sensor having a light conductor according to the invention. Alternatively, instead of the mirror element 21, the output detector 22 can also be arranged at this point.

Figure 20:
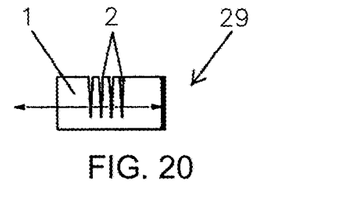

FIG. 20 shows the end 29 of the light conductor 1, as is used in the embodiment shown in FIG. 8. In this case, a planar mirror element 21 is arranged at the end 29 of the light conductor 1.

Figure 21:
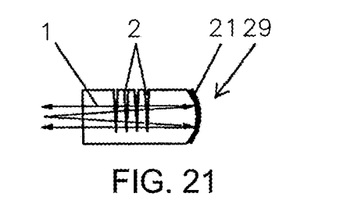

The end 29 of the light conductor 1 shown in FIG. 21 is rounded and an adapted mirror element 21 is formed on the end 29 of the light conductor. As a result, light beams passing through the light conductor 1 can be bundled.

Various aspects in the production of optical waveguides according to the invention are considered in FIGS. 22 to 32. In this case, a notch 29, which is illustrated and described in the figures, serves merely for illustration purposes and represents a local weakening of the light conductor. A weakening can also be carried out without material removal and can be of a purely structural and/or chemical nature. Such weakenings cannot be viewed or displayed in any case. The statements made about the notch 29 therefore apply, where applicable, to the same extent also for other visible and non-visible attenuations of the light conductor.

Figure 22:
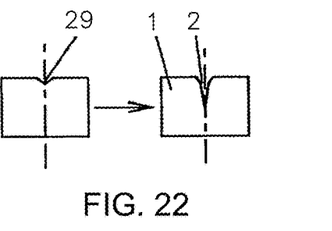
FIG. 22 shows a schematic diagram of a production method according to the invention of the light conductor according to the invention.

FIG. 22 shows a schematic diagram of a production method according to the invention of a light conductor 1 according to the invention having a crack 2.

In the embodiment of the method illustrated, a notch 29 is first produced in the light conductor. A force then acts on the light conductor and the notch is recessed into a crack 2.

Figure 23:
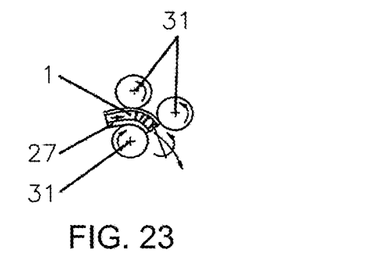
FIG. 23 shows a first implementation form of the method.

In the embodiment shown in FIG. 23, the force for producing the cracks in the form of rollers 31 acts on the light conductor 1.

It can be seen that only the optical waveguide itself receives cracks, but the cladding layer 27 remains undamaged. This effect can be produced, for example, by the selection of materials with different brittleness and serves for this purpose to support the structural integrity of the light conductor.

Figure 24:
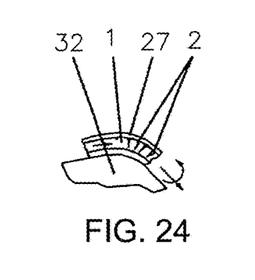
FIG. 24 shows a second implementation form of the method.
Figure 25:
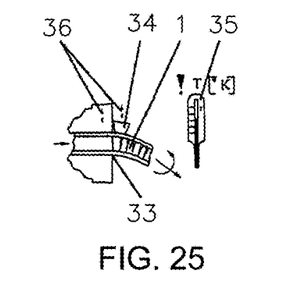
FIG. 25 shows a third implementation form of the method.

In of FIG. 24, the light conductor 1 is drawn over an edge 32 in order to produce the cracks 2. FIG. 25 shows a light conductor 1 which emerges from a gap 33 and the deformation of which is brought about by a stamp 34.

In principle, different conditions can have an influence on the size and quality of the cracks during the production of the cracks. These are likewise shown by way of example in FIG. 25.

For example, the temperature (symbolized by a thermometer 35) has an influence on the brittleness of the material itself. Furthermore, internal stresses can also be generated by means of specific temperature differences, which can lead to the further above-described weakenings of the material independently of other methods.

Of course, it is also possible to produce such stresses directly during the production, for example during the application of the covering layer 27, the covering layer 23 or the carrier 3.

Vibrations (represented by the arrows 36) can influence the nature of the boundary surfaces 9. Thus, in a preferred development of this method according to the invention, the light conductor can be caused to oscillate by means of ultrasound, in order to generate particularly advantageous boundary surfaces 9.

In principle, vibrations can also be advantageously used in addition to the other methods mentioned. For example, the rollers 31 in FIG. 23, the light conductor in FIG. 22, or the edge 32 can also oscillate in FIG. 24. Analogously, for example, the light conductor in FIG. 26 can also execute torsional oscillations using ultrasound.

Figure 26:
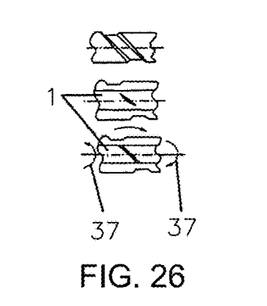
FIG. 26 shows further implementation forms of the method.

FIG. 26 shows an alternative implementation form of a method according to the invention for producing the cracks 2 in the light conductor 1. In this case, the envelope layer 27 is first thinned in regions. A shearing force (represented by the arrows 37) is then exerted on the light conductor.

Figure 27:
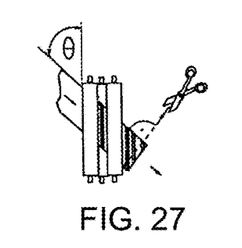
FIG. 27 shows a first method for generating the angle of incidence $\theta$.

FIG. 27 shows a first method for generating the angle of incidence θ. In this method, the cracks in the light conductor are generated directly at the desired angle of incidence θ. For this purpose, in the embodiment shown, rollers 31 are used analogously to FIG. 23, and the light conductor 1 is moved in the angle of incidence θ is guided through the rollers 31. However, other possibilities are conceivable and applicable.

Figure 28:
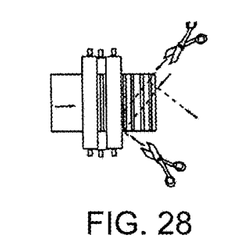
FIG. 28 shows a second method for generating the angle of incidence $\theta$.

In the embodiment shown in FIG. 28, the cracks 2 are initially generated orthogonally to a longitudinal direction of a light conductor 1, which has a flat cross-sectional shape. Only after generating the cracks 2, the light conductor 1 is cut to size (represented by scissors 38) that the angle of incidence θ is formed.

As already explained in relation to FIG. 22, it can be advantageous to provide the light conductor with notches 29, in order to control the formation of cracks according to the invention. FIGS. 29 to 32 show, by way of example, various possibilities for generating such notches 29.

Figure 29:
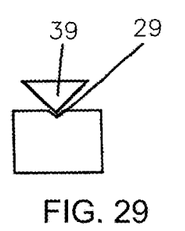
FIG. 29 shows a first method for producing a notch.

In the method shown in FIG. 29, the notch 29 is mechanically formed by a sharp object, for example a wedge or a blade. This method is particularly advantageous when a plurality of wedges, for example on a roller, are arranged one behind the other, since as many notches can be produced at the same time.

Figure 30:
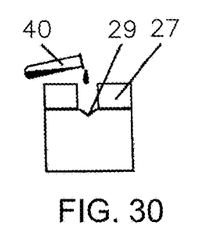
FIG. 30 shows a second method for producing a notch.

FIG. 30 shows a second method for producing the notch 29, in which first the envelope layer 27 is removed along the desired notch profile (and thus also along the desired crack profile). This can be achieved, for example, by cutting, melting, light treatment, such as, for example, UV or electron beam lithography, or vaporize. The notch is then chemically removed at the thus exposed point of the light conductor 1 (represented by a test tube 40). The advantage of this method is that it is very precise.

Figure 31:
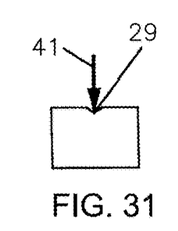
FIG. 31 shows a third method for producing a notch.

In the case of the implementation form shown in FIG. 31, the notch 29 or attenuation is generated by a beam (represented by an arrow 41). Various beam techniques can be used in the nano- to micrometer range. In this way, a weakening can be produced in that, for example, by means of UV-, electron beams, x-ray beams or ion beams, chemical bonds are broken up.

Furthermore, it is also possible for an actual notch 29 to be produced, for example by evaporating material with a laser with a suitable wavelength.

A combination of an internal weakening and a pronounced notch can also be produced. Ion beams thus wear away material on the surface of the light conductor and destroy the chemical bonds under the removed material.

In contrast thereto, electrons radiated onto the surface of the light conductor do not wear away anything, but locally destroy chemical bonds and lead to heating and electrical charging.

This method is particularly advantageous in the case of light conductors 1 made of particularly hard materials or with a particularly large cross-section.

Figure 32:
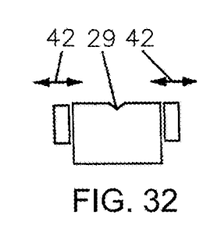
FIG. 32 shows a fourth method for producing a notch.

In the case of the implementation form shown in FIG. 32, the notch is produced by targeted material fatigue caused by vibrations (represented by arrows 42). As already explained above, the nature of the cracks 2 can thereby be positively influenced.

In principle, however, it is also possible for the cracks to be produced by other mechanical methods such as, for example, cutting or nanoimprinting, or to provide the cracks directly during the production of the light conductor by means of a corresponding casting mold.

As already explained above with reference to FIG. 9, the light conductor 1 according to the invention can be used for alternative sensory purposes in the case of cracks which are open towards the surroundings. This alternative and independent of the embodiments described further above advantageous use of the light conductor according to the invention is explained in more detail below.

Since the width W of the cracks is preferably in the range of a few to a few hundred nanometers, in the event of an opening of the cracks towards the environment, even only (nano) particles of a certain size can penetrate into the cracks. In this case, the optical properties of the cracks change depending on the materials which have penetrated into the cracks.

Therefore, if the opening of the cracks takes place in a controlled manner and at the same time a spectral analysis of the light introduced into the light conductor is carried out, preferably when white light is introduced, both the particle size and the composition of the particles penetrated into the cracks and/or other substances can be analyzed. Furthermore, additional information about the geometry of the particles can be obtained, for example, by changing the polarization direction of the light, for example when particle plasmons are excited, the particles can optionally also be previously geometrically aligned by the cracks or other means, such as for example, electromagnetic fields, sound or flow. Particles of known geometry, in particular metallic particles, can also be introduced into the cracks, in particular the crack walls, in order to improve chemical analysis by means of excited particle plasmons. It this way a plurality of analysis steps can thus be saved and the analysis can be carried out online.

An analysis of particle size and chemical composition can be desired, for example, when fine dust loading is determined, since it is known from many substances that they are substantially harmful to health when a certain particle size is undershot.

In principle, this application form of the light conductor according to the invention can advantageously be used to determine and characterize nanoparticles in nanotechnology.

Two possible examples of application are explained with reference to the highly schematic representations of FIGS. 33 to 36.

Figure 33:
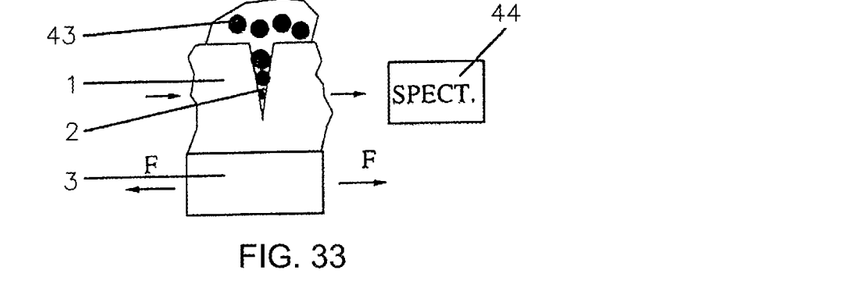
FIG. 33 shows a first embodiment of an alternative sensory application of a light conductor according to the invention.

FIG. 33 shows a light conductor 1 according to the invention, which is arranged on a carrier 3. A controlled force F is exerted on the carrier, as a result of which the crack 2 is widened and particles 43 can get into it. Light (represented by arrows) passes through the light conductor and the penetrated particles and is then spectrally analyzed in a corresponding device.

It can also be expedient in this special application to use two light conductors according to the invention in a sensor element.

In this case, the second light conductor serves as a reference for the first light conductor.

Figure 34:
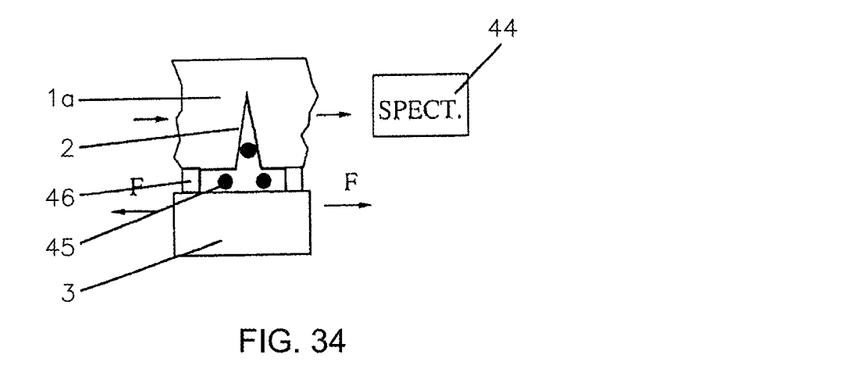
FIG. 34 shows a reference light conductor for the embodiment of FIG. 33.

Such a reference light conductor 1a is shown in FIG. 34.

Forces F of equal magnitude act on the same as on the analytically used light conductor of FIG. 33. This can be implemented in a particularly simple manner by arranging both optical waveguides on the same carrier in a preferred development of the application.

Reference particles are located in the region of the cracks 2 of the reference light conductor, which are held by limitations 46 in the region of the crack 2. Furthermore, the boundaries 46 prevent undesirable particles from reaching the reference light conductor.

Figure 35:
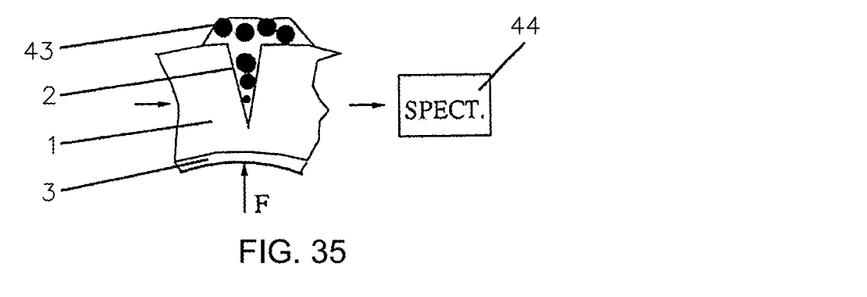
FIG. 35 shows a second embodiment of an alternative sensory application of a light conductor according to the invention and FIG. 36 shows a reference light conductor for the embodiment of FIG. 35.
Figure 36:
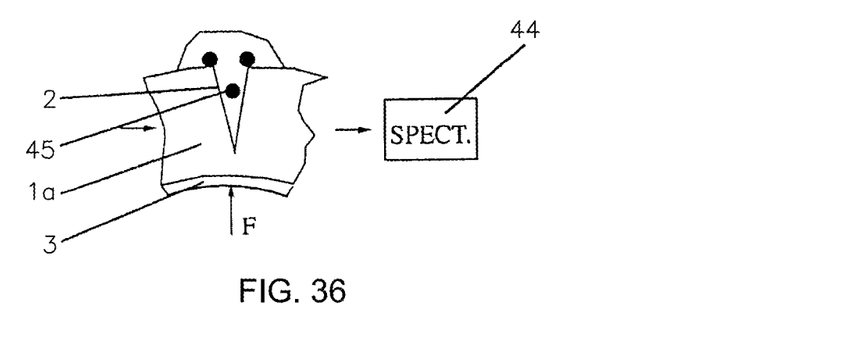

FIG. 35 shows a second exemplary embodiment of an analytically used light conductor 1 according to the invention. In the latter, the force F, with which a deflected deformation of the light conductor is to be achieved, acts, from below onto the conductor and achieves expansion of the cracks by bending. A corresponding reference light conductor 1a is shown in FIG. 36.

In principle, a second light conductor can also be used entirely without particles, in order to determine the precise crack width of the analytically used light conductor via the deformation-based applications described above.

A combination of all three light guides, applied analytically, detecting the deformation and as a reference light guide (with reference particles) is of course also conceivable. In such an application, it can also be expedient to alternately couple the light into the different light conductors.

The controlled deformation of the light conductor can be effected, for example, by piezo actuators.

In principle, the light conductor according to the invention can be used for many further applications.

For example, the light conductor can be cooled or cooled and heated by a Peltier element. In this case, condensing water leads to a change in the intensity of the light emerging from the light conductor and can give information about the relative atmospheric humidity in the surroundings of the light conductor in combination with the difference between room temperature and light conductor temperature.

In a further example of use, the light conductor according to the invention could be mounted on a membrane and detect vibrations of the membrane. In this example of use, the light conductor could then work, for example, as a microphone or pressure sensor. A further development of this embodiment would be, for example, to mount a very thin light conductor directly on the strings of a stringed instrument. In this case the light conductor according to the invention could serve as a sound pickup.

Diaphragm-free microphones or pressure sensors can also be produced by the angle of incidence $\theta$ is slightly larger, typically by less than 1° greater than the critical angle of the total reflection $$\left(\theta \leq 90 - \arcsin\left(\frac{n_m}{n}\right)\right),$$

in particular $$\theta \leq 90 - \arctan\left(\frac{n_m}{n}\right).$$

A pressure-induced change in the refractive index of the medium in the cracks 2 results in a light intensity modulation of the light passing through at the cracks 2. Pressure fluctuations or sound frequencies can thus be measured into the MHZ range. For example, extremely large pressure ranges can be covered by a sensor, from "almost vacuum" to, if applicable, hundreds of bar, wherein the sensor maintains a particularly high sensitivity in each pressure range, that is to say that the sensor in a high-pressure tank can nevertheless register even the smallest pressure fluctuations.

In the application example as membrane-free microphones or pressure sensors, in addition to the light conductor 1 according to the invention with cracks 2 optionally a rotatable mounted light source and a detector may be provided.

The light source, preferably a light source with polarized light, for example a white light source or a laser diode, is rotatable mounted in order to finely adjust the angle of incidence $\theta$ and to be able to change the direction of polarization. The exiting light can be measured by means of a spectrometer.

Analogously to the detection of the vibrations for acoustic sensors, the light conductor according to the invention can also be mounted on a material having a known thermal expansion and can thus be used as a very precise thermometer with a large temperature range. If, for example, a material having a high melting point (eg. nickel), a very cost-effective possibility can be created by means of a light conductor according to the invention, to cover a temperature range of several hundred Kelvin with a sensor (eg. 200 K to 800 K)

Furthermore, it is conceivable to also apply the light conductors in the non-visible region of the electromagnetic spectrum, since this form of radiation also follows the same principles as light.

Of course, the width of the cracks is to be adapted accordingly.

If, for example, terahertz radiation is used, cracks would rather be produced in the millimeter range than in the nanometer range.

REFERENCE NUMBERS 1 light conductor
1a reference light conductor
2 cracks
3 carrier
4 means for coupling in light
5 means for decoupling light
6 arrow input intensity
7 arrow output intensity
8 axis (propagation direction)
9 boundary surfaces (crack)
11 arrows reflection intensity
12 sensor element
13 optical separation element
14 sensor
15 control unit
16 means for generating light/light source
17 beam splitter
18 input detector
19 light conductor (conventionally)
21 mirror element
22 output detector
23 cover layer
24 intermediate layer
25 recess
26 mounting layer
27 envelope layer
28 crack as beam splitter
29 notch
31 roller
32 edge
33 gap
34 stamp
35 thermometer
36 arrow (vibration)
37 arrow (shear movement)
38 scissors
39 wedge
40 test tube
41 arrow (beam)
42 arrows (vibration)
43 particles
44 device for spectral analysis
45 reference particles
46 boundaries
$I_I$ input intensity
$I_T$ output intensity
$I_R$ reflection intensity
D height of crack
W width of crack
α opening angle
θ angle of incidence between propagation direction of the light guide and the longitudinal direction of the cracks
F force (which acts on the light conductor)

The invention claimed is:

1. Light conductor having a body forming at least one crack in the body, wherein a longitudinal direction of the crack to a propagation direction of the light conductor spans an angle of incidence (θ) and wherein the crack is formed and limited by two boundary surfaces in the body, which are each substantially parallel to the longitudinal direction of the crack, wherein the two boundary surfaces span an opening angle (α), wherein the opening angle (α) is greater than 0°, wherein a first boundary surface is located in the direction of propagation of the light conductor at the transition from the light conductor to a medium filled in the crack, wherein a second boundary surface is located in the direction of propagation of the light conductor at the transition from the medium to the light conductor, wherein on the first boundary surface an evanescent wave is produced, wherein the second boundary surface is arranged within the evanescent wave and wherein the crack has a depth lower than the thickness of the body of the light conductor;

wherein the opening angle α in the neutral state of the optical light conductor, the following applies:

$$0 < \alpha < \frac{k}{d} < 90°,$$

wherein d is a depth of the light conductor and k is a factor which is dependent of a wavelength λ, with which the light conductor is operated, wherein the factor k at a wavelength λ from 0.0002 mm to 0.001 mm is equal to 0.57, wherein the factor k at a wavelength λ from 0.001 mm to 0.003 mm is equal to 1.7, wherein the factor k at a wavelength λ from 0.003 mm to 0.05 mm is equal to 28, and wherein the factor k at a wavelength λ from 0.05 mm to 1 mm is equal to 157.

2. The light conductor according to claim 1, wherein the light conductor has a refractive index n, that the medium is located in the crack and has a refractive index $n_m$ and that for the angle of incidence (θ) the following applies:

$$\theta \leq 90 - \arctan\left(\frac{n_m}{n}\right)$$

in particular $$\theta \leq 90 - \arcsin\left(\frac{n_m}{n}\right)$$

3. The light conductor according to claim 1, wherein the crack has an opening, and that the opening in a neutral state of the light conductor has a width (W) with a value of 0 nm<W<25000 nm.

4. The light conductor according to claim 1, wherein the light conductor has at least two cracks, and that all the cracks of the light conductor with their angles of incidence (θ) and their opening angles (α) are aligned substantially identically.

5. The light conductor according to claim 1, wherein the light conductor comprises polystyrene.

6. The light conductor according to claim 1, wherein the light conductor consists of a silicate.

7. An optical sensor with at least one light conductor and with means for feeding in and reading out of light in and out of the light conductor, wherein the light conductor is a light conductor according to claim 1.

8. The optical sensor according to claim 7, wherein the optical sensor has at least two light conductors, and that the light conductors are arranged with oppositely oriented opening angles α of the cracks.

9. The light conductor according to claim 1, wherein the medium is air.

* * * * *